(12) United States Patent
Balk (10) Patent No.: US 9,365,352 B2
(45) Date of Patent: Jun. 14, 2016

(54) CONVEYOR

(71) Applicant: Specialty Conveyor B.V., Zwaag (NL)

(72) Inventor: Wouter Balk, Baambrugge (NL)

(73) Assignee: Specialty Conveyor B.V., Zwaag (NL)

( * ) Notice: Subject to any disclaimer, the term of this patent is extended or adjusted under 35 U.S.C. 154(b) by 0 days.

(21) Appl. No.: 14/387,802

(22) PCT Filed: Mar. 26, 2013

(86) PCT No.: PCT/EP2013/056394
§ 371 (c)(1),
(2) Date: Sep. 24, 2014

(87) PCT Pub. No.: WO2013/144139
PCT Pub. Date: Oct. 3, 2013

(65) Prior Publication Data
US 2015/0083552 A1    Mar. 26, 2015

(30) Foreign Application Priority Data
Mar. 27, 2012 (EP) .................................... 12161576

(51) Int. Cl.
 *B65G 21/18* (2006.01)
 *B65G 21/22* (2006.01)
 *B65G 47/51* (2006.01)
(52) U.S. Cl.
 CPC .............. *B65G 21/18* (2013.01); *B65G 21/22* (2013.01); *B65G 2207/24* (2013.01)
(58) Field of Classification Search
 CPC .................................................... B65G 21/18
 USPC ................................ 198/406, 408, 778, 844.1
 See application file for complete search history.

(56) References Cited

U.S. PATENT DOCUMENTS

| 5,413,213 A | 5/1995 | Golz et al. |
| 5,490,589 A | 2/1996 | Golz et al. |

(Continued)

FOREIGN PATENT DOCUMENTS

| CN | 1093673 | 10/1994 |
| CN | 102123925 | 7/2011 |

(Continued)

OTHER PUBLICATIONS

International Search Report and Written Opinion from the European Patent Office for corresponding International Application No. PCT/EP2013/056394, filed Mar. 26, 2013.

*Primary Examiner* — Douglas Hess
(74) *Attorney, Agent, or Firm* — Steven M. Koehler; Westman, Champlin & Koehler, P.A.

(57) ABSTRACT

A conveyor comprises a frame, an endless conveyor belt supported by the frame in a conveying direction along a helical path, a non-helical path and a transfer path. The helical path has an upright center line. The belt includes a plurality of plates movably coupled to each other. The frame comprises at least at the helical path a radial guide, wherein the radial guide supports a plate at a radial guide contact location thereof in radial direction with respect to the center line of the helical path, a bearing guide for upwardly supporting the plates, wherein the bearing guide supports a plate at a bearing guide contact location thereof, and an auxiliary guide for compensating a torque on a plate at the bearing guide contact location about an axis directed in the conveying direction. The auxiliary guide contacts a plate at an auxiliary guide contact location thereof.

18 Claims, 6 Drawing Sheets

(56) References Cited

U.S. PATENT DOCUMENTS

| | | | |
|---|---|---|---|
| 5,833,045 A * | 11/1998 | Osti et al. | 198/444 |
| 6,260,688 B1 * | 7/2001 | Steeber et al. | 198/347.4 |
| 6,591,963 B2 * | 7/2003 | Wipf | 198/347.2 |
| 6,601,697 B2 * | 8/2003 | Steeber et al. | 198/844.1 |
| 7,032,742 B2 * | 4/2006 | Hartness et al. | 198/594 |
| 7,810,629 B2 * | 10/2010 | Kronseder et al. | 198/347.1 |
| 8,028,820 B2 * | 10/2011 | Giehrl et al. | 198/594 |
| 8,162,129 B2 * | 4/2012 | Franz | 198/475.1 |
| 8,302,763 B2 * | 11/2012 | Broers et al. | 198/778 |
| 8,365,905 B2 * | 2/2013 | Fege | 198/812 |
| 8,678,174 B2 * | 3/2014 | Balk | 198/602 |
| 8,695,785 B2 * | 4/2014 | Balk et al. | 198/778 |
| 2002/0195317 A1 | 12/2002 | Wipf | |
| 2010/0089724 A1 | 4/2010 | Broers et al. | |

FOREIGN PATENT DOCUMENTS

| | | |
|---|---|---|
| CN | 102351090 | 2/2012 |
| EP | 1902978 A1 | 3/2008 |

* cited by examiner

CONVEYOR

CROSS-REFERENCE TO RELATED APPLICATION

This application is a Section 371 National Stage Application of International Application No. PCT/EP2013/056394 filed Mar. 26, 2013 and published WO 2013/144139 A1 in English

BACKGROUND

The discussion below is merely provided for general background information and is not intended to be used as an aid in determining the scope of the claimed subject matter.

Aspects of the invention relate to a conveyor, which comprises a frame, an endless conveyor belt supported by the frame and driven by driving means in a conveying direction along a helical path, a non-helical path and a transfer path extending between the helical path and the non-helical path, wherein the helical path has an upright center line, and wherein the conveyor belt includes a plurality of plates which are movably coupled to each other and each plate having an upper transport face and a central axis.

Such a conveyor is known from U.S. Pat. No. 5,413,213 or U.S. Pat. No. 5,490,589. The endless conveyor belt of the known conveyor follows an outer helical path upwardly, after which it leaves the outer helical path via a transfer path to an S-shaped path which is coupled to an inner helical path along which the conveyor belt is guided downwardly. A disadvantage of the known conveyor is that the conveyor belt is not guided stable enough between the helical path and the S-shaped path. In order to keep the conveyor belt on track a relatively high tension force on the conveyor belt is required. This is, however, disadvantageous in terms of friction between the conveyor belt and the frame. A radial guide of relatively large height might seem a possible solution, but this is undesired since a large construction height of the conveyor belt makes it difficult to guide the conveyor belt about reversing wheels. Besides, a large construction height limits vertical space between two neighboring helical windings.

SUMMARY

The Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the background.

An aspect of the present invention is to provide a conveyor in which the endless belt is transferred between the helical path and the non-helical path in a stable and reliable manner.

This is achieved with the conveyor according to claim 1.

Due to the presence of the auxiliary guide at the helical path a torque on the plate about its bearing guide contact location which is caused by, for example, an article on the conveyor belt is compensated. This means that the plates have less tendency to bending downwardly with respect to the bearing guide. As a consequence, if the conveyor belt moves from the helical path to the non-helical path the plates have a substantially predefined vertical position at the entrance of the transfer path, which provides the opportunity to facilitate further guidance of the conveyor belt. At the transfer path the conveyor belt leaves the helical path in case of moving from the helical path to the non-helical path, or approaches the helical path when moving from the non-helical path to the helical path.

It is noted that contact surfaces at the bearing guide and the bearing guide contact location, and/or the auxiliary guide and the auxiliary guide contact location may be oriented substantially horizontally in order to exert a force onto the plate substantially in vertical direction, but the orientation of the mentioned contacts may be inclined such that an exerted force onto the panel has a vertical as well as a horizontal component.

In a practical embodiment the surface of the plate at the auxiliary guide contact location faces downwardly. This means that the plate is upwardly supported at two different locations in radial direction with respect to the center line of the helical path: at the bearing guide and at the auxiliary guide.

The radial guide contact location may be formed by a portion of a circumferential surface of a roller which is mounted to the corresponding plate. This minimizes friction forces in the helical path. Preferably the roller has an axis of rotation which coincides with the central axis of the plate, since this is advantageous in terms of stability of the plate.

In an alternative embodiment the radial guide comprises a plurality of rollers for supporting the plates at their radial guide contact locations.

In another alternative embodiment the radial guide comprises a plurality of rollers for supporting the plates at their radial guide contact locations which rollers are mutually coupled to form an endless series of rollers running with respect to the frame. In this case the rollers run along with passing plates and return along another path after a certain distance of guiding the plates. The velocity of the axes of rotation, i.e. the speed of the series of rollers, is smaller than the local speed of the passing conveyor belt.

The rollers may be cylindrical, spherical or diabolo-shaped. In case of a spherical or diabolo-shaped roller the radial guide contact location and the bearing guide contact location may coincide.

The plates may be interconnected by an endless driving member, which preferably engages at the central axes of the plates. In practice, the endless driving member is a chain or the like. It is noted that the endless driving member can also be supported by the frame such that the plates are indirectly supported by the frame at the endless driving member. In that case the bearing guide and the auxiliary guide may be defined as located remote from the endless driving member.

Alternatively, the plates are interconnected such that the plates themselves form an endless driving member. For example, each plate may form a link of a chain.

In an advantageous embodiment the bearing guide contact location and the auxiliary guide contact location of the plate are located at opposite sides of the central axis, since this improves a proportional force distribution onto the plates.

The plate may comprise a second radial guide contact location which has a normal that is directed opposite to that of the radial guide contact location. This provides the opportunity to guide the plates in curves which bend in opposite direction to that of the helical path, for example within the non-helical path.

If the plate is mirror symmetrical in a plane that extends perpendicularly to the upper transport face and parallel to the conveying direction, the conveyor belt can be used in another helical path where the frame has similar guides as at the helical path, but an opposite helical line.

In a specific embodiment the conveyor comprises a second helical path and a second transfer path which extends between the non-helical path and the second helical path, whereas the second helical path and the helical path have opposite helical lines.

The non-helical path may comprise an S-shaped path as seen from above. This provides the opportunity to design the conveyor such that the helical path and the second helical path surround each other whereas the S-shaped path forms a connection between the helical path and the second helical path. This means, that the conveyor belt first follows the helical path in a vertical direction, then the S-shaped path, and subsequently the second helical path in opposite vertical direction. In the S-shaped path the plates may be supported upwardly and sidewardly at both sides of an endless driving member, for example at the bearing guide contact location, the auxiliary guide contact location and the radial guide contact location of the plate. In a specific embodiment the S-shaped path comprises at least a U-shaped portion which bends about an angle that is larger than 180°. Such a U-shaped portion may have a shape like a tadpole head as seen from above and creates gradual sideward movements of the conveyor belt along the paths. Nevertheless, the U-shaped portion may bend 180° or less, as well.

In another specific embodiment the non-helical path partly comprises a helical path, for example a portion of a helical winding.

At least at the helical path the frame may comprise a retaining guide for keeping the plates downwardly to the bearing guide, wherein the retaining guide contacts a plate at a retaining guide contact location thereof, wherein the auxiliary guide contact location is located at a distance from the retaining guide contact location, as seen in a radial cross-section of the helical path. The retaining guide prevents the plates from being lifted from the bearing guide within the helical path. This may typically happen under operating conditions if a plate is free from a load thereon.

In practice the plates and the frame may be arranged such that at the transfer path the plates are displaceable in radial direction to a predetermined radial position with respect to the center line, where the retaining guide contact location of the plate is free from the retaining guide. This allows the plate to be lifted from at least the bearing guide if the conveyor belt moves in a direction from the helical path to the non-helical path, or to be moved downwardly to the bearing guide if the conveyor belt moves in a direction from the non-helical path to the helical path before the plate is displaced in radial direction towards the center line of the helical path and the retaining guide contact location contacts the retaining guide.

In order to support and/or guide the plates in vertical direction between the helical path and the non-helical path the frame may be provided with at least a transfer rail at the transfer path. The transfer rail may support the plates in vertical direction in addition to the bearing guide within a portion of the transfer path. This means that in at least a portion of the transfer path the plates may be supported by both the bearing guide and the transfer rail. In another portion of the transfer path the plates may be supported by the transfer rail and still another transfer rail, for example for guiding the conveyor belt in vertical direction. It is also possible that the transfer rail functions as a retaining guide to prevent the plates from tilting about an axis parallel to the conveying direction at the transfer path.

The transfer rail or transfer rails may extend to the non-helical path as seen from the helical path to the non-helical path and/or may even smoothly transfer into a non-helical guide or non-helical guides for guiding the conveyor belt further along the non-helical path. As seen from the non-helical path to the helical path the transfer rail or transfer rails may extend up to or beyond the transfer path, hence partly within the helical path. Preferably, the vertical position of the transfer rail or transfer rails at a transition region between the helical path and the transfer path corresponds with the vertical positions of the bearing guide and the auxiliary guide such that a smooth transition of the conveyor belt between the bearing guide and the auxiliary guide, on the one hand, and the transfer rail or transfer rails, on the other hand, is obtained. Furthermore, at the transfer path the transfer rail or at least one of the transfer rails may be located between a longitudinal center line of the conveyor belt and the center line of the helical path in order to obtain a stable transition of the conveyor belt between the helical path and the non-helical path.

In a specific embodiment the transfer rail and a non-helical guide for guiding the conveyor along the non-helical path are fixed to each other. Furthermore, the transfer rail and the non-helical guide can be displaceable with respect to the bearing guide and the auxiliary guide in the conveying direction. This means that the transfer path and the non-helical path together can move with respect to the helical path such that a transition location between the helical path and the transfer path can be at different locations along the helical path.

In a specific embodiment, under operating conditions the conveyor belt is successively driven along the helical path, the transfer path and the non-helical path, wherein the conveyor is adapted such that at the transfer path the plates are first moved in outward radial direction whereas the plates contact the bearing guide and the auxiliary guide, after which the transfer rail takes over and supports the plates. At the transfer path the transfer rail may have a distance from the bearing guide and the auxiliary guide in radial direction with respect to the center line of the helical path. Of course, the conveyor belt may be driven in reverse direction.

BRIEF DESCRIPTION OF THE DRAWINGS

Hereafter aspects of the invention will be elucidated with reference to drawings showing embodiments of the invention very schematically.

DETAILED DESCRIPTION OF THE ILLUSTRATIVE EMBODIMENTS

Figure 1:
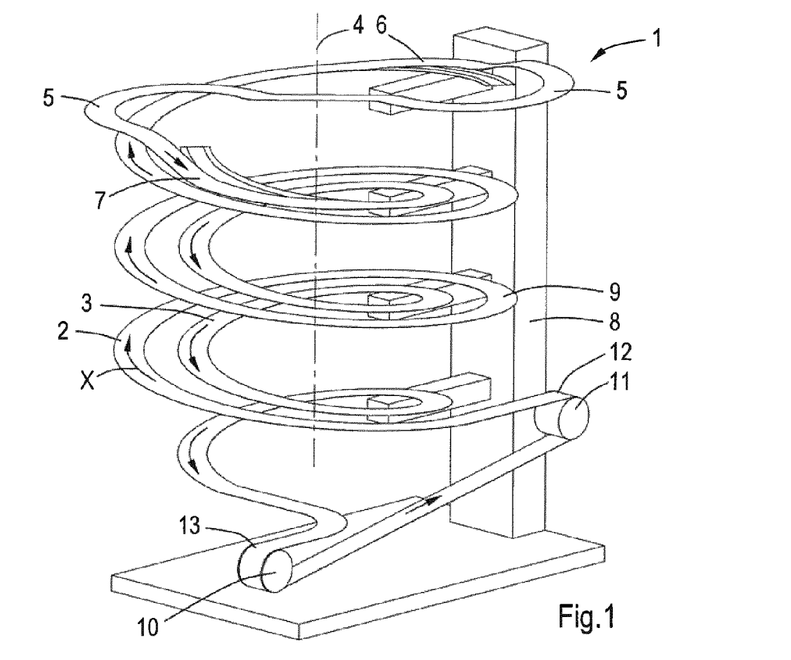
FIG. 1 is a perspective view of an embodiment of a conveyor according to the invention.
Figure 2:
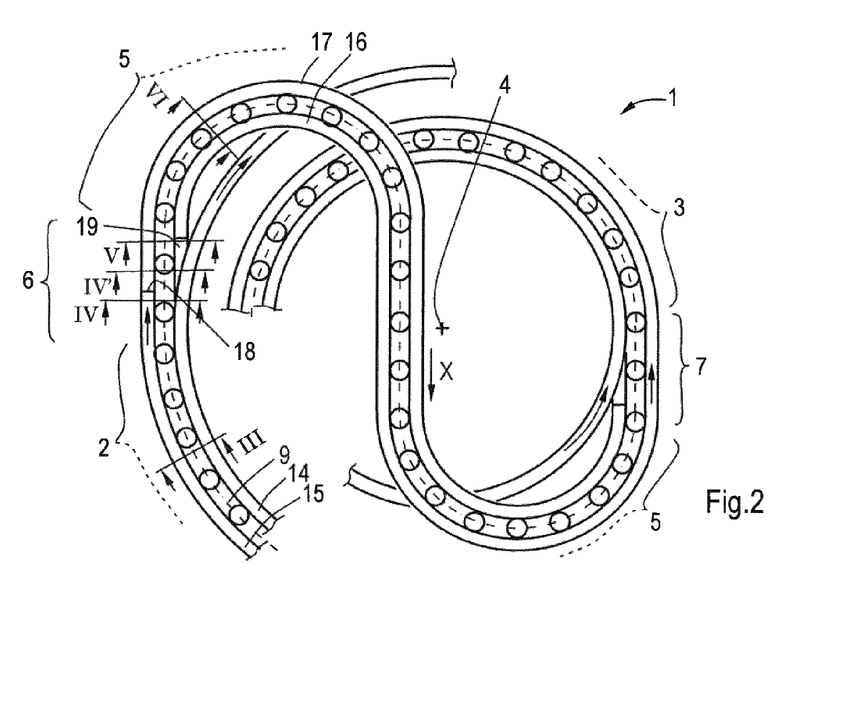
FIG. 2 is a partial plan view of the embodiment as shown in FIG. 1.

FIG. 1 shows an embodiment of a conveyor 1 and FIG. 2 shows a part thereof as seen from above. In FIG. 2 a lower portion of the conveyor 1 is not shown for clarity reasons. The conveyor 1 comprises an outer helical path 2 and an inner helical path 3. The outer helical path 2 surrounds the inner helical paths 3 and both helical paths 2, 3 have a common vertical center line 4.

The conveyor 1 further comprises a non-helical path in the form of an S-shaped path 5, which extends between the inner and outer helical paths 2, 3. Between the outer helical path 2 and the S-shaped path 5 extends an outer transfer path 6 and between the inner helical path 3 and the S-shaped path 5 extends an inner transfer path 7. FIG. 2 shows that the inner and outer transfer paths 7, 6 extend tangentially with respect to the inner and outer helical paths 3, 2, respectively, as seen from above.

The conveyor 1 is provided with a frame 8, which supports an endless conveyor belt 9. The conveyor belt 9 is driven by driving means, for example an electric motor, in a conveying direction X. The conveyor 1 is arranged such that the conveyor belt 9 successively follows the outer helical path 2 upwardly in clockwise direction as seen from above, the outer transfer path 6, the S-shaped path 5, the inner transfer path 7, the inner helical path 3 downwardly in anti-clockwise direction as seen from above, and is subsequently guided back to the outer helical path 2 via pulleys 10, 11. In practice, articles can be fed to the conveyor 1 at an article receiving station 12 and transported to an article discharging station 13 through the mentioned paths.

FIG. 2 illustrates that the conveyor belt 9 is guided by an inner helical rail 14 and an outer helical rail 15 along the outer helical path 2, whereas the conveyor belt 9 is guided by an inner S-shaped rail 16 and an outer S-shaped rail 17 along the S-shaped path 5. Along at least a portion of the outer transfer path 6 the conveyor belt 9 is guided by an outer transfer rail 18 and an inner transfer rail 19. The outer helical rail 15 and the outer transfer rail 18 have a larger distance to the center line 4 of the helical paths 2, 3 than the inner helical rail 14 and the inner transfer rail 19, respectively. It is noted that due to the S-shape the difference of distance from the center line 4 to the outer S-shaped rail 17 and the inner S-shaped rail 16 varies along the S-shaped path 5. Adjacent to the outer transfer path 6 the distance from the center line 4 to the outer S-shaped rail 17 is larger than to the inner S-shaped rail 16.

In the embodiment as shown the inner and outer helical rails 14, 15, transfer rails 18, 19 and S-shaped rails 16, 17 are fixed to the frame 8 at mutual horizontal distances transversely to the conveying direction X.

Figure 3:
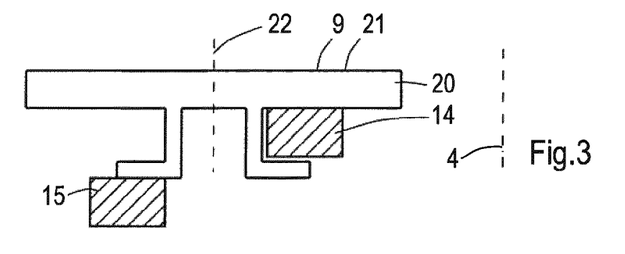
FIGS. 3-6 are enlarged cross-sectional views along the lines III-III to VI-VI, respectively, of FIG. 2.
Figure 4:
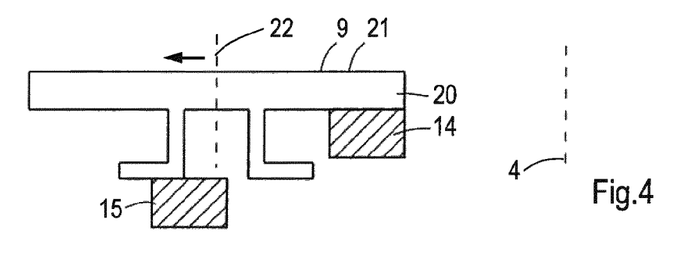
Figure 5:
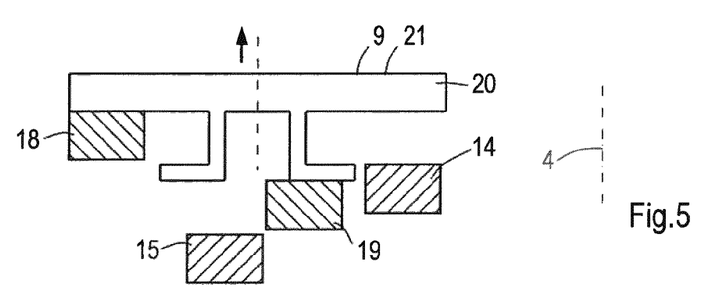

In order to explain the functioning of the conveyor 1 FIG. 3-6 show cross-sectional views at different locations along the outer helical path 2, the outer transfer path 6 and the S-shaped path 5. The center line 4 is only drawn for indicating its position with respect to the conveyor belt 9, but its distance with respect to the conveyor belt 9 is not drawn at correct scale. FIG. 3 shows that the conveyor belt 9 is supported by the inner and outer helical rails 14, 15 in the outer helical path 2. FIGS. 4, 4' and 5 illustrate by arrows that at the outer transfer path 6 the conveyor belt 9 first moves with respect to the inner and outer helical rails 14, 15 in outward radial direction with respect to the center line 4, after which the inner and outer transfer rail 19, 18 guide the conveyor belt 9 upwardly. Hence, in an upstream portion of the outer transfer path 6 the conveyor belt 9 is still supported by the inner and outer helical rails 14, 15, but the contact locations are shifting due to the relative movement of the conveyor belt 9, whereas in a downstream portion of the outer transfer path 6 the inner and outer transfer rails 19, 18 take over the supporting function of the inner and outer helical rails 14, 15.

FIG. 4' shows an intermediate situation in which the inner and outer transfer rails 19, 18 support the conveyor belt 9 together with the inner and outer helical rails 14, 15. The positions of the inner and outer transfer rails 19, 18 can be such that during the period within which the inner and outer transfer rails 19, 18 as well as the inner and outer helical rails 14, 15 support the conveyor belt 9 the inclinations of the rails 14, 15, 18, 19 in the conveying direction X are more are less similar so as to create a gradual transfer.

Although in FIG. 2 the outer transfer rail 18 and the outer helical rail 15 seem to be aligned where the transfer path 6 is adjacent to the helical path 2, but in practice there may a distance between them in radial direction with respect to the center line 4, depending on the location where the outer transfer rail 18 and the outer helical rail 15 support the conveyor belt 9.

It is noted that in an alternative embodiment a single transfer rail may be applied. In that case in a portion of the transfer path 6 the conveyor belt 9 may still be supported in a similar manner as illustrated in FIG. 4, but in another portion of the transfer path 6 only the single transfer rail may support the conveyor belt 9. The conveyor belt 9 and the single transfer rail may be arranged such that the single transfer rail engages the plate at least at the bearing guide contact location and the retaining guide contact location.

Figure 19:
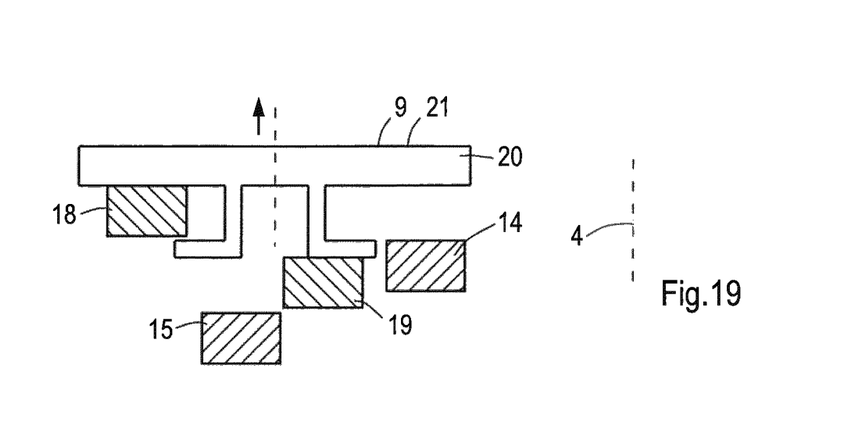
FIG. 19 is a similar view as FIG. 5, but showing an alternative embodiment.

FIG. 19 illustrates a situation of an alternative embodiment which has inner and outer transfer rails 19, 18, but where the outer transfer rail 18 is disposed such that the conveyor belt 9, when leaving the helical path 2, is taken over by the outer transfer rail 18 such that the conveyor belt 9 is prevented from lifting upwardly with respect to the outer transfer rail 18.

Figure 6:
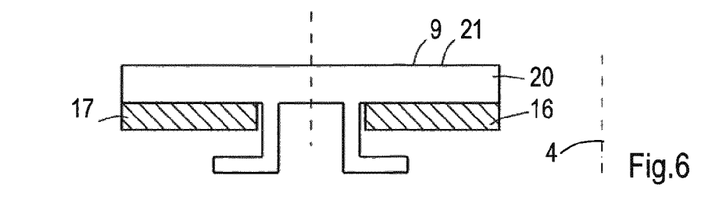

FIG. 6 shows that at the S-shaped path 5 the inner and outer S-shaped rails 16, 17 support the conveyor belt 9 and guide it through the S-shaped path 5.

When the conveyor belt 9 leaves the S-shaped path 5 and follows the inner transfer path 7 to the inner helical path 3 the conveyor belt 9 is supported and guided in reverse order with respect to the outer transfer path 6. At the inner transfer path 7 the conveyor belt 9 will be moved downwardly and subsequently in radial direction towards the center line 4 and then guided by rails through the inner helical path 3.

Due to the fact that the conveyor belt 9 is upwardly supported at at least two different locations transversely to the conveying direction X at the S-shaped path 5, at the inner and outer transfer paths 6, 7 and at the inner and outer helical paths 2, 3 the conveyor 1 functions very stable and reliable. The risk of derailment is minimized and a relatively high tension force on the conveyor belt 9 to keep it on track is not required.

Figure 18:
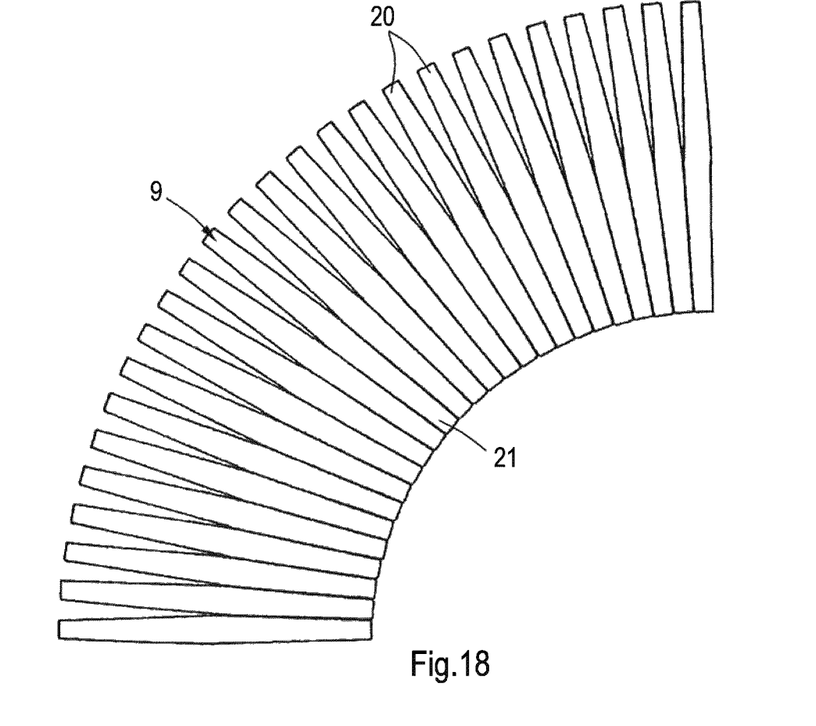
FIG. 18 is an enlarged plan view of a portion of the conveyor belt in the conveyor of FIG. 1.

In the embodiment as shown in FIGS. 1 and 2 the conveyor belt 9 includes a plurality of plates 20 which are movably coupled to each other and which have upper transport faces 21. FIG. 18 shows a portion of the conveyor belt 9 within the outer helical path 2 as seen from above. In this embodiment the upper transport faces 21 are flat and joined to each other so closely that articles may be supported by a number of adjacent plates 20. The plates 20 are pivotally interconnected through an endless driving member or connecting member such as a chain. It is noted that for clarity reasons FIG. 2 only shows the endless connecting member.

The plates 20 are mutually pivotable around a first axis that extends parallel to their upper transport face 21 and perpendicularly to the conveying direction X, and a second axis that extends perpendicularly to the upper transport face 21. The first mentioned pivotal movement enables the bending of the conveyor belt 9 around the pulleys 10 and 11, see FIG. 1. The second mentioned pivotal movement allows the following of curves in the inner and outer helical paths 2, 3, the inner and outer transfer paths 6, 7 and the S-shaped path 5.

Each plate 20 of the conveyor belt 9 has a central axis 22. The upper transport face 21 is elongated in transverse direction of the conveying direction X. Each upper transport face 21 is slightly tapered from its central axis 22 to the ends thereof, which avoids interference in curves. A lot of different shapes and dimensions of the upper transport face 21 and the rest of the plate 20 are conceivable.

FIGS. 7-17 show cross-sections of different embodiments of the plates 20 and cooperating supporting and guiding means at a location within the outer helical path 2 along the line III-III in FIG. 2. The embodiments of the plates 20 and supporting and guiding means may be combined with a different embodiment of a conveyor than shown in FIG. 1. It is, for example, conceivable that an alternative conveyor does not have an S-shaped path 5, inner transfer path 7 and inner helical path 3, but in which the conveyor belt 9 follows the outer helical path 2, the outer transfer path 6 and then a different non-helical path (not shown), whereas the conveyor belt 9 is subsequently guided back to the outer helical path 2. It is also possible that the non-helical path 5 partly comprises a helical path, for example a part of a helical winding within an S-shaped path.

Figure 7:
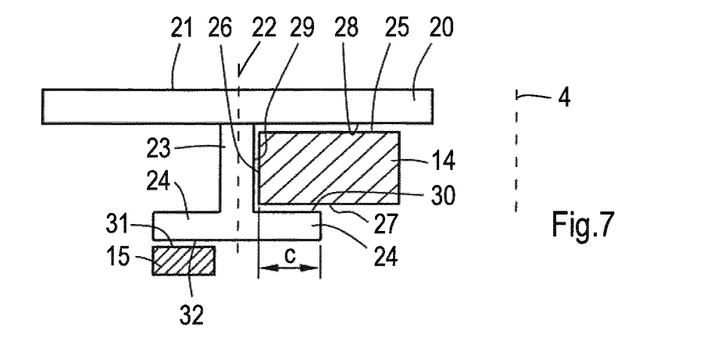
FIGS. 7-17 are similar views as FIG. 3, but showing alternative embodiments of the conveyor.

FIG. 7 shows a cross-section of a plate 20 of an alternative embodiment of the conveyor 1. The plate 20 has an upright flange 23 located at the central axis 22 of the plate 20 and opposite to the upper transport face 21. The flange 23 is coupled to a chain (not shown), but the plates 20 may also be interconnected with their flanges 23, such that the flanges 23 in fact form a part of the chain. Furthermore, the plate 20 is provided with outwardly directed feet 24 at the lower end of the flange 23. The feet 24 extend parallel to the upper transport face 21.

The inner helical rail 14 is provided with a bearing guide 25 for supporting the plates 20 upwardly, a radial guide 26 for guiding the plates 20 along the outer helical path 2, and a retaining guide 27 for keeping the plates 20 downwardly to the bearing guide 25. The bearing guide 25 supports a plate 20 at a bearing guide contact location 28 thereof. The radial guide 26 supports a plate 20 at a radial guide contact location 29 thereof in outward radial direction with respect to the center line 4 of the outer helical path 2. The radial guide contact location 29 is formed by a side wall of the flange 23 which faces to the center line 4. The retaining guide 27 contacts the plate 20 at a retaining guide contact location 30 thereof. As illustrated in FIG. 7 there may be a play between the retaining guide 27 and the retaining guide contact location 30.

In the embodiment of FIG. 7 the bearing guide contact location 28, the radial guide contact location 29 and the retaining guide contact location 30 comprise substantially flat contact surfaces. Supporting forces that are exerted by the inner helical rail 14 onto the plate 20 will have resultant forces in three different directions at three different locations of the plate 20 in this embodiment, although the bearing guide contact location 28 and the radial guide contact location 29, on the one hand, and the radial guide contact location 29 and the retaining guide contact location 30, on the other hand, are adjacent to each other.

The outer helical rail 15 comprises an auxiliary guide 31. The auxiliary guide 31 contacts the plate 20 at an auxiliary guide contact location 32 thereof. In this case the auxiliary guide contact location 32 is formed by a lower surface of the plate 20 directed in opposite direction with respect to the upper transport face 21. More specifically, the auxiliary guide contact location 32 is formed by a lower surface portion of the feet 24. The auxiliary guide contact location 32 is located at a distance from the radial guide contact location 29 and the bearing guide contact location 28, as seen in radial cross-section of the outer helical path 2. Similar to the inner helical rail 14 a supporting force that is exerted by the outer helical rail 15 onto the plate 20 will have a resultant force at one specific location within a contact surface that is formed by the auxiliary guide contact location 32. A function of the auxiliary guide 31 is to compensate a torque on the plate 20 at the bearing guide contact location 28 about an axis directed in the conveying direction X.

For example, if an article is placed on the upper transport face 21 in FIG. 7 and the resultant downward force thereof applies at the central axis 22 of the plate 20, that force will create a torque at the bearing guide contact location 28 about an axis parallel to the conveying direction X. This may lead to tilting of the plate about the bearing guide 25. In order to compensate the torque the auxiliary guide contact location 32 has a horizontal distance from the bearing guide contact location 28 in radial direction with respect to the center line 4.

Figure 8:
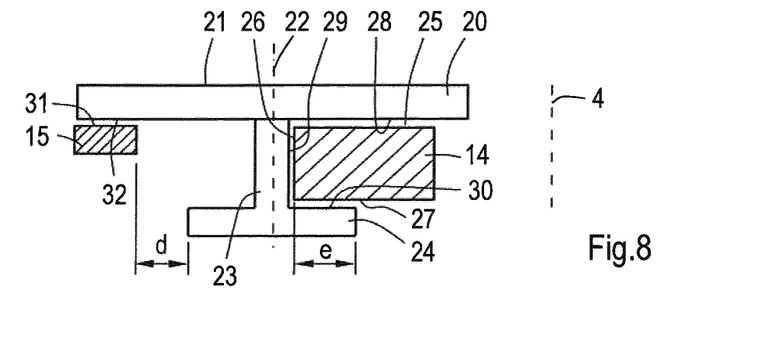

FIG. 8 shows an arrangement of the plate 20 and associated inner helical rail 14 and outer helical rail 15 of an alternative embodiment of the conveyor 1. In comparison to the embodiment according to FIG. 7 the outer helical rail 15 has a different location with respect to the inner helical rail 14 in the helical path 2. In this case the auxiliary guide contact location 32 is formed by a portion of a bottom surface of the plate 20 below and opposite to the upper transport face 21. If a downward force is exerted onto the upper transport face 21 at a location beyond the bearing guide contact location 28 as seen from the center line 4 the resulting torque will be compensated by an upwardly directed reaction force of the auxiliary guide 31 onto the bottom surface of the plate 20.

It is noted that the plate 20 and the inner helical rail 14 and the outer helical rail 15 are adapted such that the plate 20 is displaceable away from the center line 4 at the outer transfer path 6. This allows the plate 20 to move in outward direction in the outer transfer path 6 as illustrated in FIG. 4. In the embodiment of the plate 20 in FIG. 7 there is no barrier to displace the plate to the left with respect to the inner helical rail 14 and the outer helical rail 15, but the minimum displacement must be larger than a distance c before the plate 20 can be lifted. Distance c is the distance between the radial guide contact location 29 and an end of the feet 24 located between the radial guide contact location 29 and the center line 4. It is conceivable that in an alternative embodiment the plates are only moved in radial direction at the transfer path without the necessity of a vertical displacement. On the other hand, it is conceivable that the plates are only moved in vertical direction at the transfer path in order to approach or leave the outer helical path 2.

In the embodiment of FIG. 8 the distance in radial direction of the center line 4 between the outer helical rail 15 and an end of the foot 24 located between the outer helical rail 15 and the central axis 22, indicated by distance d, must be larger than the distance in radial direction of the center line 4 between the radial guide contact location 29 and an end of the foot 24 located between the radial guide contact location 29 and the center line 4, indicated by distance e. This allows the plate 20 to be lifted from the bearing guide 25 and the auxiliary guide 31 without being blocked by the inner helical rail 14 and the outer helical rail 15. Upon lifting the plate 20 the feet 24 pass through the opening between the inner helical rail 14 and the outer helical rail 15.

Figure 9:
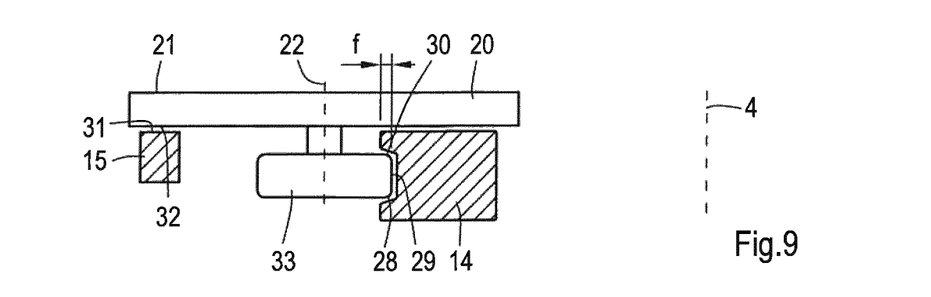

FIG. 9 shows an alternative embodiment in which the plate 20 comprises a cylindrical guide roller 33 having an upright axis of rotation which substantially coincides with the central axis 22. The inner helical rail 14 has a trough-shaped cross-section for guiding the roller 33. In this embodiment the radial guide contact location 29 of the plate 20 is formed by a portion of a circumferential surface of the roller 33. The bearing guide contact location 28 and the retaining guide contact location 30 are formed by side edge portions of the roller 33. Under operating conditions the bearing guide contact location 28 and the retaining guide contact location 30 can contact opposite side walls of the trough-shaped inner helical rail 14. The auxiliary guide 31 of the outer helical rail 15 contacts the plate 20 at the auxiliary guide contact location 32 thereof, which is formed by a lower surface of the plate 20 directed in opposite direction with respect to the upper transport face 21. The auxiliary guide contact location 32 is located at one side of the central axis 22 of the plate 20, whereas the radial guide contact location 29, the bearing guide contact location 28 and the retaining guide contact location 30 are located at the opposite side thereof, which corresponds to the side where the center line 4 is located.

Figure 13:
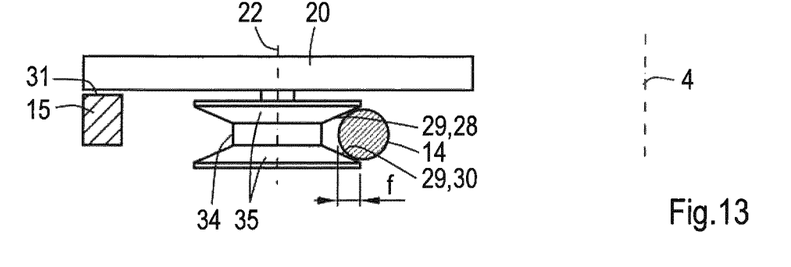

In an alternative embodiment as shown in FIG. 13 the guide roller 34 has a diabolo shape and the inner helical rail 14 has a circular cross-section for guiding the guide roller 34. The diabolo shape is formed by two roller flanges 35 having inner walls at the circumferential edge of the guide roller 34 that face to each other. The distance between the inner walls increases in radial direction from the axis of rotation of the guide roller 34. In this embodiment the radial guide contact location 29 of the plate 20 is formed by two inner wall portions of the inner walls of the roller flanges 35, which inner wall portions are at a distance from each other in a direction along the axis of rotation of the guide roller 34, but at a same radial distance from the axis of rotation. The bearing guide contact location 28 and the retaining guide contact location 30 are also formed by the inner wall portions and substantially coincide with the respective inner wall portions of the radial guide contact location 29 in this case. The location of the auxiliary guide 31 with respect to the plate 20 is similar to the embodiment as shown in FIG. 9.

In the embodiments according to FIGS. 9 and 13 the distance in outward radial direction of the center line 4 between the outer circumference of the roller flanges 35 and the outer edge of the inner helical rail 14, indicated by distance f, must be bridged by the plate 20 at the outer transfer path 6 before the plate 20 is guided upwardly with respect to the inner and outer helical rails 14, 15.

Figure 10:
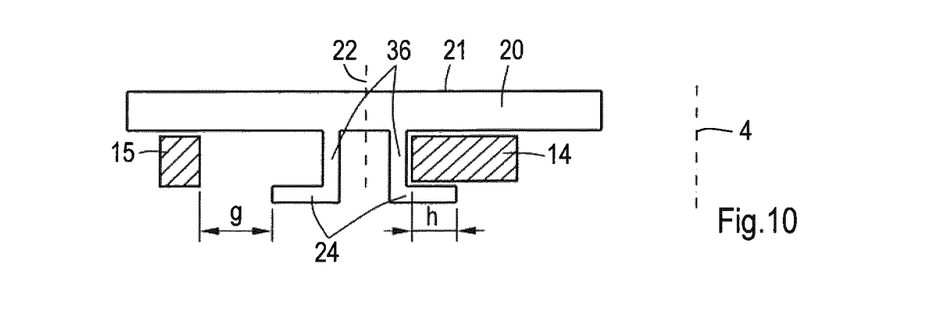

The embodiment of the plate 20 as shown in FIG. 10 has upright flanges 36 which protrude downwardly with respect to the upper transport face 21. In this case the flanges 36 extend parallel to each other and perpendicularly to the upper transport face 21. Furthermore, the plate 20 is provided with outwardly directed feet 24 at the lower ends of the flanges 36, comparable to the embodiment according to FIGS. 7 and 8. The chain for driving the conveyor belt 9 extends between the flanges 36 and is coupled to the flanges 36. In order to be able to lift the plate 20 with respect to the inner and outer helical rails 14, 15 at the outer transfer path 6 the outward radial displacement before lifting must be larger than the indicated distance h, but smaller than the indicated distance g.

Figure 11:
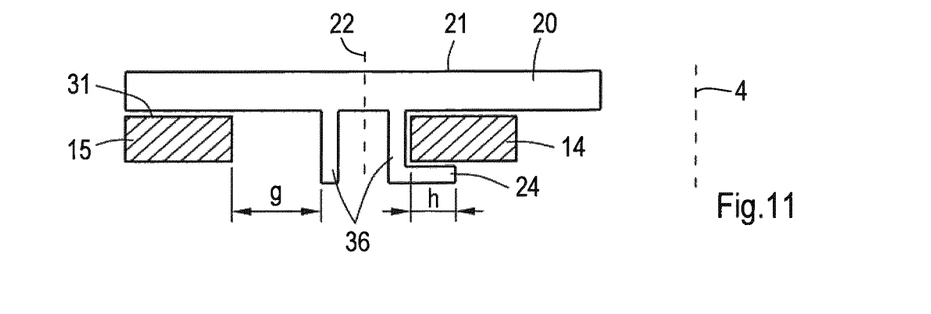

The embodiment of the plate as shown in FIG. 11 is also provided with upright flanges 36, but only one of the flanges 36 has an outwardly directed foot 24 at the lower end thereof. This provides the opportunity to apply a relatively broad auxiliary guide 31, whereas sufficient free space is created between the auxiliary guide 31 and the footless flange 36, indicated by distance g. In this case the plate 20 is not mirror symmetrical in a plane that extends perpendicularly to the upper transport face 21 and parallel to the conveying direction X.

Figure 12:
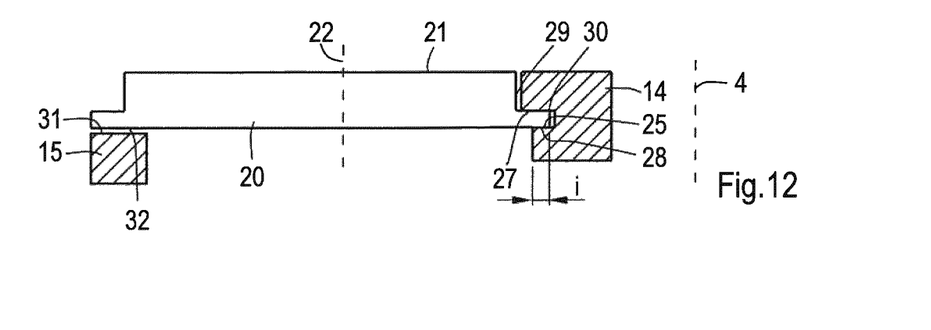

FIG. 12 shows an alternative embodiment in which the inner helical rail 14 has a trough shape. The inner helical rail 14 supports the plate 20 at a staggered end portion thereof which is located at the side of the center line 4 of the outer helical path 2. Under operating conditions the inner helical rail 14 may exert a radial force on the radial guide contact location 29, an upwardly directed force on the bearing guide contact location 28 and a downwardly directed force on the retaining guide contact location 30 at the mentioned end portion of the plate 20. The outer helical rail 15 exerts an upwardly directed force on the auxiliary guide contact location 32 at an opposite end portion of the plate 20.

It is noted that in the embodiment according to FIG. 12 the retaining guide 27 of the inner helical rail 14 and the corresponding retaining guide contact location 30 may be arranged such that in addition to a torque compensation force of the auxiliary guide 31 a further torque compensation is provided. This is typically the case if the location of the downwardly directed resultant force of the retaining guide 27 on the retaining guide contact location 30 is closer to the center line 4 than the upwardly directed resultant force of the bearing guide 25 on the bearing guide contact location 28. In practice this happens when the effective contact surface between the retaining guide 27 and the plate 20 lies closer to the center line 4 of the outer helical path 2 than the effective contact surface between the bearing guide 25 and the plate 20. In order to be able to lift the plate 20 with respect to the inner and outer helical rails 14, 15 at the outer transfer path 6 the outward radial displacement before lifting must be larger than the indicated distance i.

The embodiment as shown in FIG. 12 may be a mat conveyor belt or another type of modular conveyor belt, in which modules are mutually pivotable about an upright axis which extends beyond the central axis 22 as seen from the center line 4, possibly near ends of the modules.

Figure 14:
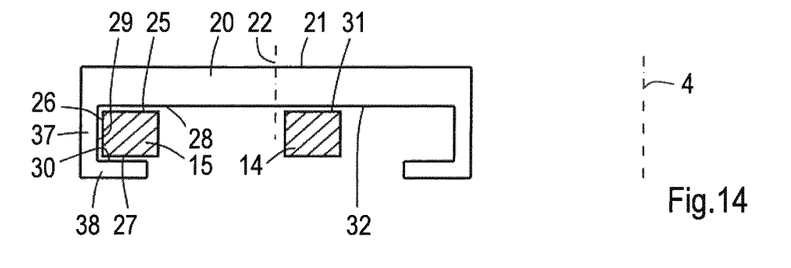

FIG. 14 shows an alternative embodiment in which the outer helical rail 15 is provided with the bearing guide 25, the radial guide 26 and the retaining guide 27. The bearing guide 25 supports the plate 20 at the bearing guide contact location 28 thereof. The radial guide 26 supports the plate 20 at the radial guide contact location 29 thereof in outward radial direction with respect to the center line 4 of the outer helical path 2. The retaining guide 27 contacts the plate 20 at the retaining guide contact location 30 thereof. The radial guide contact location 29 is formed by an inner side wall of an upright flange 37 which is mounted at an end of the plate 20 and which is directed downwardly. The retaining guide contact location 30 is formed at an upper surface portion of a foot 38 at a lower end of the flange 37. The foot 38 is directed to the center line 4.

In the embodiment according to FIG. 14 the inner helical rail 14 comprises the auxiliary guide 31. The auxiliary guide 31 contacts the plate 20 at the auxiliary guide contact location 32 thereof. In this case the auxiliary guide contact location 32 is formed by a lower surface of the plate 20 directed in opposite direction with respect to the upper transport face 21. In the plate 20 of FIG. 14 the auxiliary guide contact location 32 is located between the central axis 22 and the center line 4, whereas the bearing guide contact location 28, the radial guide contact location 29 and the retaining guide contact location 30 are located beyond the central axis 22 as seen from the center line 4.

Figure 15:
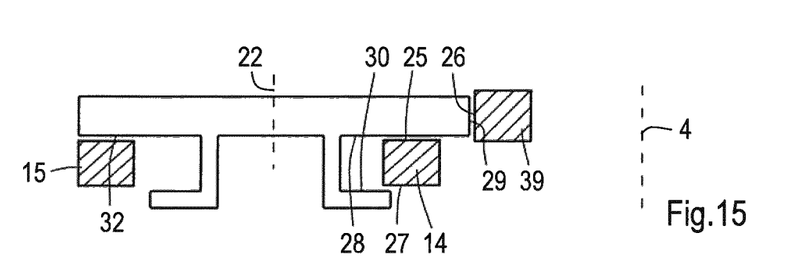

In the embodiment according to FIG. 15 the inner helical rail 14 comprises the bearing guide 25 and the retaining guide 27. The radial guide 26 is provided on a second inner helical rail 39 and exerts an outward radial force on the radial guide contact location 29 which is formed at an upright side edge at an end of the plate 20 that is closer to the center line 4 than an opposite end thereof.

Figure 16:
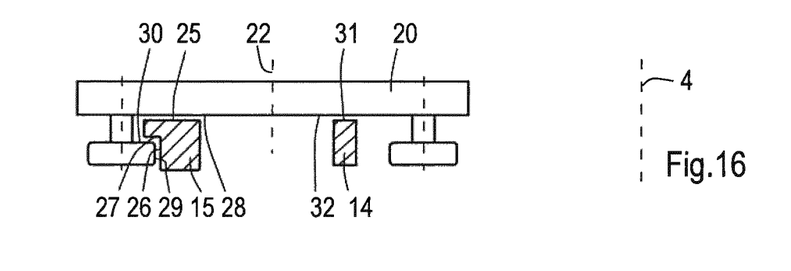

In the embodiment as shown in FIG. 16 the plate 20 comprises two guide rollers having axes of rotation at opposite sides of the central axis 22. The outer helical rail 15 comprises the bearing guide 25, the radial guide 26 and the retaining guide 27. The inner helical rail 14 comprises the auxiliary guide 31. The plate 20 is mirror symmetrical in a plane that extends perpendicularly to the upper transport face 21 and parallel to conveying direction. The roller at the side closest to the center line 4 cooperates with a supporting rail (not shown) at the inner helical path 3.

Figure 17:
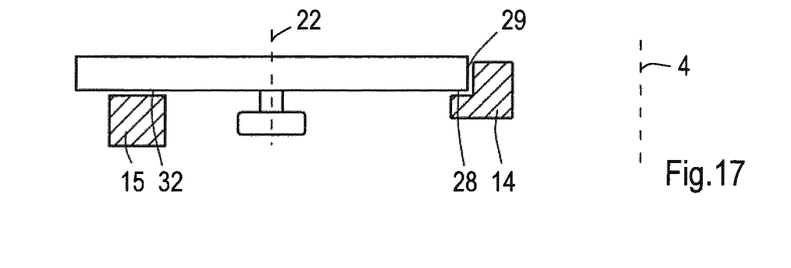

FIG. 17 illustrates an embodiment which is not provided with a retaining guide in the outer helical path 6.

In an alternative embodiment (not shown) the inner and outer transfer rails 18, 19 as well as the inner and outer S-shaped rails 16, 17 are fixed to a common transition unit which is movable with respect to the inner and outer helical rails 14, 15. Referring to FIGS. 1 and 2 this would mean that the inner and outer transfer paths 6, 7 and the S-shaped path 5 would be fixed to each other, but that these paths as a single unit 5, 6, 7 would be rotatable about the center line 4 and translatable along the center line 4. Referring to FIG. 4' the transition unit will be displaceable such that the inner and outer transfer rails 19, 18 move along the inner and outer helical rails 14, 15, whereas the relative positions of the rails at shown in FIG. 4' are maintained. In other words, the transition unit is movable with respect to the inner and outer helical rails 14, 15 in the conveying direction X. As a consequence, a transition location between the outer helical path 2 and the outer transfer path 6 can be at different locations along the outer helical path 2. The resulting length variation of the conveyor belt 9 along the paths 2, 6, 5, 7, 3 between the article receiving station 12 and the article discharging station 13 may be compensated by known means.

From the foregoing it will be clear that the conveyor according to the invention can be moved in a stable and reliable manner along and between the helical path and the non-helical path due to the supporting means of the frame and the characteristics of the conveyor belt.

The invention is not limited to the embodiments as shown in the drawings and described hereinbefore, which may be varied in different manners within the scope of the claims. It is, for example, not necessary that the transfer paths extend tangentially with respect to the inner and outer helical paths.

The invention claimed is:

1. A conveyor, comprising a frame, an endless conveyor belt supported by the frame and driven by a drive in a conveying direction along a helical path, a non-helical path and a transfer path extending between the helical path and the non-helical path, wherein the helical path has an upright center line, wherein the conveyor belt includes a plurality of plates which are movably coupled to each other and each plate having an upper transport face and a central axis, wherein the frame comprises at least at the helical path a radial guide configured to guide the plates along the helical path, wherein the radial guide supports a plate at a radial guide contact location thereof in radial direction with respect to the center line of the helical path, a bearing guide for upwardly supporting the plates, wherein the bearing guide supports the plate at a bearing guide contact location thereof, an auxiliary guide configured to compensate a torque on the plate at the bearing guide contact location about an axis directed in the conveying direction, which auxiliary guide contacts the plate at an auxiliary guide contact location thereof, which is located at a distance from the radial guide contact location and the bearing guide contact location, as seen in a radial cross-section of the helical path, wherein the auxiliary guide contact location is located at least a horizontal distance from the bearing guide contact location in radial direction with respect to the center line, whereas the normal to the surface of the plate at the auxiliary guide contact location has a vertical component, wherein at the transfer path the plates are displaceable relatively to the radial guide, the bearing guide and the auxiliary guide in radial direction with respect to the center line and/or in vertical direction.

2. The conveyor according to claim 1, wherein at the helical path the surface of the plate at the auxiliary guide contact location faces downwardly.

3. The conveyor according to claim 1, wherein the radial guide contact location is formed by a portion of a circumferential surface of a roller which is mounted to the corresponding plate.

4. The conveyor according to claim 3, wherein the rollers are cylindrical, spherical or diabolo-shaped.

5. The conveyor according to claim 1, wherein the plates are interconnected by an endless driving member.

6. The conveyor according to claim 1, wherein the bearing guide contact location and the auxiliary guide contact location of the plate are located at opposite sides of the central axis.

7. The conveyor according to claim 1, wherein the plate comprises a second radial guide contact location having a normal which is directed opposite to that of the radial guide contact location.

8. The conveyor according to claim 1, wherein the plate is mirror symmetrical in a plane that extends perpendicularly to the upper transport face and parallel to the conveying direction.

9. The conveyor according to claim 1, comprising a second helical path and a second transfer path which extends between the non-helical path and the second helical path, wherein the second helical path and the helical path have opposite helical lines.

10. The conveyor according to claim 9, wherein the non-helical path comprises an S-shaped path as seen from above.

11. The conveyor according to claim 10, wherein the S-shaped path comprises at least a U-shaped portion which bends about an angle that is larger than 180°.

12. The conveyor according to claim 1, wherein at least at the helical path the frame comprises a retaining guide for keeping the plates downwardly to the bearing guide, wherein the retaining guide contacts a plate at a retaining guide contact location thereof, wherein the auxiliary guide contact location is located at a distance from the retaining guide contact location, as seen in a radial cross-section of the helical path.

13. The conveyor according to claim 12, wherein the plates and the frame are arranged such that at the transfer path the plates are displaceable in radial direction to a predetermined radial position with respect to the center line, where the retaining guide contact location of the plate is free from the retaining guide.

14. The conveyor according to claim 1, wherein the frame is provided with at least a transfer rail at the transfer path for supporting and/or guiding the plates in vertical direction between the helical path and the non-helical path, wherein said transfer rail may support the plates in vertical direction in addition to the bearing guide within a portion of the transfer path.

15. The conveyor according to claim 14, wherein under operating conditions the conveyor belt is successively driven along the helical path, the transfer path and the non-helical path, wherein the conveyor is configured such that at the transfer path the plates are first moved in outward radial direction whereas the plates contact the bearing guide and the auxiliary guide, after which the transfer rail takes over and supports the plates.

16. The conveyor according to claim 1, wherein the radial guide comprises a plurality of rollers for supporting the plates at their radial guide contact locations.

17. The conveyor according to claim 1, wherein the radial guide comprises a plurality of rollers for supporting the plates at their radial guide contact locations which rollers are mutually coupled to form an endless belt of rollers running with respect to the frame.

18. The conveyor according to claim 1, wherein the plates are interconnected such that the plates themselves form an endless driving member.

* * * * *